C. ELLIS.
PROCESS OF MAKING CATALYTIC MATERIAL.
APPLICATION FILED JAN. 24, 1913.
1,078,541.
Patented Nov. 11, 1913.
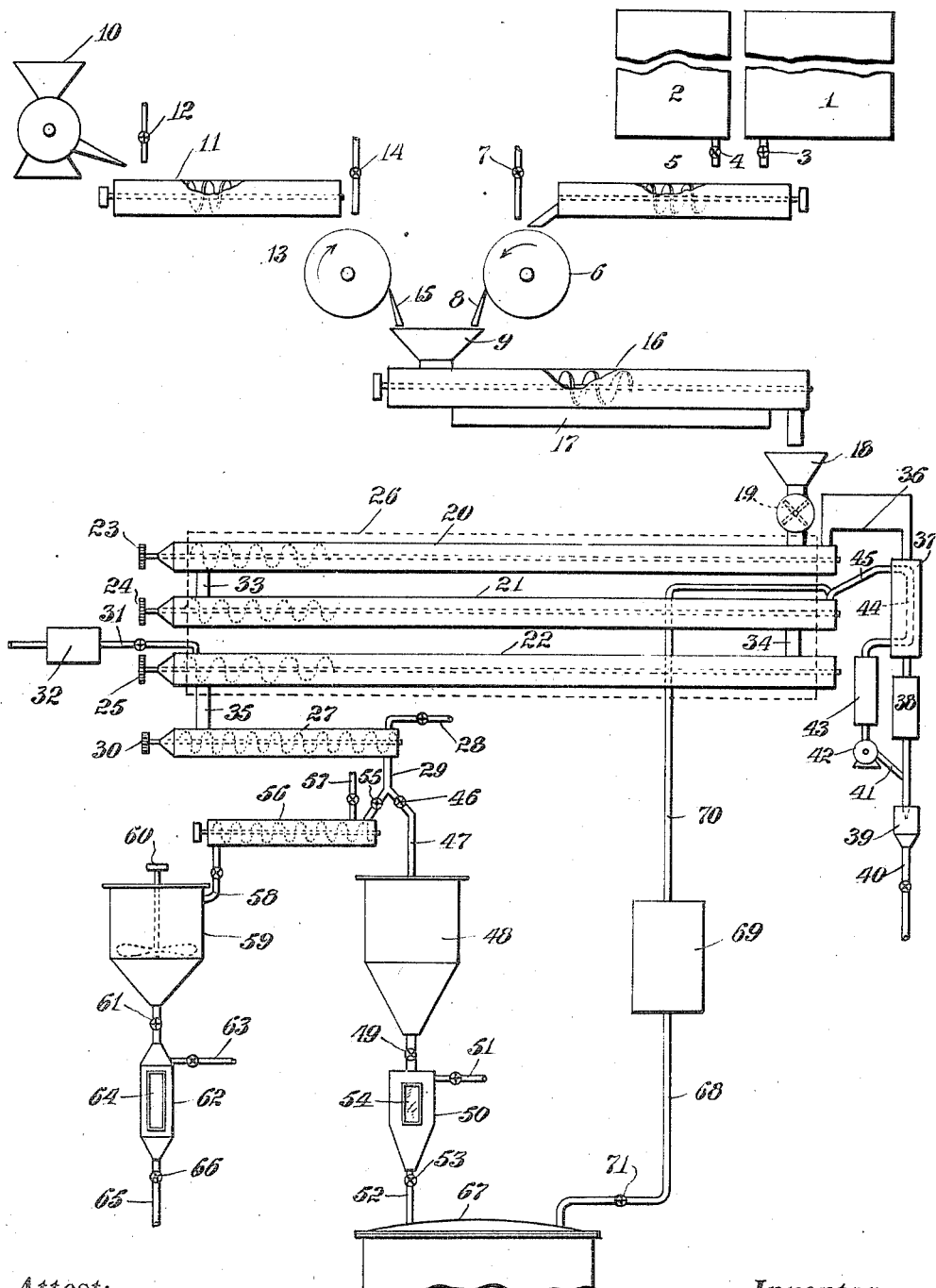
Attest:
Mitchell
B. M. Ellis.
Inventor:
Carleton Ellis

UNITED STATES PATENT OFFICE.

CARLETON ELLIS, OF MONTCLAIR, NEW JERSEY.

PROCESS OF MAKING CATALYTIC MATERIAL.

1,078,541.  Specification of Letters Patent.  Patented Nov. 11, 1913.

Application filed January 24, 1913. Serial No. 743,909.

*To all whom it may concern:*

Be it known that I, CARLETON ELLIS, a citizen of the United States, and a resident of Montclair, in the county of Essex and State of New Jersey, have invented certain new and useful Improvements in Processes of Making Catalytic Material, of which the following is a specification.

This invention relates to a process of making catalytic material and to apparatus therefor, and relates particularly to the process of preparing catalyzer preferably by reduction of an oxid, preferably in a continuous manner, and in preferably transferring the reduced product without contact with air to a body of oil or other suitable sealing medium, as hereinafter described; and this application contains matter disclosed in applications Serial Numbers 679,771; 711,745 (now Patent No. 1,052,469) and 737,942 as regards treatment of the reduced material with oil in order to prevent loss of catalytic activity through oxidation, and in application Serial No. 737,942 as regards making catalyzer in a continuous manner.

While not expressing any limitation thereby, I may state that the present invention involves or may involve the following features:

Among the objects of the invention may be enumerated the following:—1. To make preferably a more or less highly pyrophoric catalyzer which although often losing its catalytic properties on short exposure to air or oxygen is when wetted with oil capable of being handled in the air with little or no loss in activity. 2. To make preferably a composite catalyzer composed of two or more active elements, as for example in the case of an all metallic catalyzer,—one composed of nickel and cobalt or platinum—or preferably one composed of a metallic and a non-metallic catalyzer, such as cobalt and charcoal or nickel and charcoal or similar non-metallic active material. 3. To make preferably a catalyzer entirely free from non-active or inert material and one the mass of which is not diluted and needlessly augmented with material of non-catalytic properties, or even anti-catalytic in nature. 4. To make preferably a composite catalyzer in which one component has an activating or stimulating effect on the other, such action being mutual. 5. To provide a catalyzer preferably free from non-metallic material of a refractory incombustible nature, so as to enable easy recovery of the metal if such be employed. 6. To reduce same preferably continuously and preferably in such a manner that the purest reducing gas contacts with the most nearly reduced oxid or (and) with charcoal most nearly freed from occluded oxygen and other deleterious gases. 7. To secure such a degree of reduction that nickel oxid or other oxid preferably be not present in any appreciable amount, to later possibly contaminate the oily material with which it comes in contact. 8. To preferably secure reduction at the lowest effective temperature while at the same time freeing the catalyzer from deleterious oxids and occluded oxygen, etc. 9. To prevent undue waste of catalyzer during the making. 10. To prepare a catalyzer more efficient than those in ordinary use. 11. To prepare one having a higher degree of longevity in reuse. That is after one treatment of the oil, the catalyzer may be removed by filter pressing or otherwise and the oil coated catalyzer even though exposed to the air may be returned to the treating apparatus and used again, the operation being repeated several times before the catalyzer materially weakens in activity.

The invention is illustrated by the accompanying drawing which shows in partial section and elevation, apparatus suitable for the purpose; all of which is depicted in very diagrammatic fashion.

In the drawing 1 is a tank containing nickel sulfate solution and 2 is a similar tank containing caustic soda solution, or if desired carbonate of soda or other alkali.

3 and 4 are outlets delivering to the conveyer 5 where mixing of the solutions occurs and nickel hydrate and sodium sulfate are produced. The material passes onto the filtering roll 6 and is sprayed with water from the pipe 7. Finally a scraper 8 removes the nickel hydrate and delivers to the hopper 9. In the hopper 10 of the grinder a good quality of wood charcoal is fed and the comminuted product which should pass preferably a 50 or 60 mesh screen is delivered to the conveyer 11 and is sprayed with acid solution to remove lime and anti-catalytic bodies and then passes to the filtering roll 13 where soluble salts and especially sodium chlorid usually present in pharcoal is removed by washing as by spraying with hot water through the pipe 14. A doctor 15 removes the charcoal in a purified state and delivers it to the hopper 9 where it mixes with the nickel hydrate and falls into the conveyer 16. Here the two catalyzer components are well mixed but as both are insoluble in water no interdiffusion of an undesirable nature takes place. The conveyer 16 is heated by the steam bath 17 and the product discharging from this conveyer is well dried. The material falls from this conveyer to the hopper 18 which is provided with the rotary feed and seal 19 and communicates with the reducing conveyer 20. The conveyer 20 as well as the other conveyers 21 and 22 on which this is superposed are inclosed in a steam jacket or other heating device indicated by the dotted line 26, and from which the conveyer ends project and carry the driving gears 23, 24 and 25.

27 is a cooling conveyer having the hydrogen inlet 28. 29 is a discharge pipe from this cooling conveyer. The latter is driven by means of the gear 30.

The conveyers 5, 11 and 16 are preferably open while conveyers 20, 21, 22 and 27 are tightly closed and carry spiral blades, or cut flight blades or paddles. The inclosing barrels or pipes containing the conveyer blades, are stationary and in this manner a positive feed which is essential to correct adjustment of the gas, is obtained.

31 is a hydrogen inlet pipe and 32 is a preheater therefor.

33, 34, and 35 are chutes connecting the several superposed conveyers.

36 is a dust box and 37 is a heat interchanger and condenser.

38 is an auxiliary condenser.

39 is a sight feed for condensed water and 40 is a water discharge pipe.

41 is a gas return in which is interposed the pump 42 and drier 43. The dried gas passes through the heat interchanger and receives a preheating from the steam and gases coming from the reducing conveyers. The preheated gas enters the reducing system preferably through the reducing conveyer 21 as shown so as to prevent somewhat impure gas from coming into contact with the fully reduced material as would be the case if the inlet pipe 45 communicated directly with the pipe 31.

The pipe 29 branches and one leg thereof 47 carrying the valve 46 connects with the catalyzer reservoir 48. This reservoir has an outlet at the bottom controlled by the valve 49, and connecting with the measuring device 50. The latter is a closed tank with conical bottom part and having glass plates set in the sides to observe the amount of a charge of material.

51 is a high pressure hydrogen inlet pipe to blow out the catalyzer into the treating tank.

52 is a pipe leading to one or more hydrogenating apparatus 67 not here shown in detail. A charge of catalyzer having collected or been allowed to run into the measuring tank 50, hydrogen may be introduced under high pressure through 51 and thus blow the catalyzer clean from the tank 50 and passage ways into the hydrogenating tank.

The conveyer 56 and adjacent apparatus is used when the catalyst is to be conveyed in an oil medium. In this case the valve 46 is closed and a valve 55 is opened to let the catalyst fall into the conveyer 56. Oil is pumped in through the pipe 57 to make a thick to thin putty or paste and this passes by the pipe 58 to the reservoir 59 which is equipped with the stirrer 60.

61 is a valve.

62 is a measuring tank having the discharge valve 66 and outlet pipe 65.

63 is a hydrogen blow out inlet pipe.

The operation of the apparatus under the present preferred embodiment is as follows:—Nickel hydrate or cobalt hydrate prepared as indicated or preferably mixtures of the hydrate and carbonate, is fed preferably with charcoal (previously freed, if desired, from anticatalytic bodies) into the conveyer 16. The proportions should be so adjusted that preferably in the final product there is only 10% or so of metal to 90% or so of charcoal, but these proportions may be varied to suit different requirements. As a rule however in the case of charcoal a proportion of 30% or so of metal is undesirable as tending to interfere with the full operative powers possessed by active carbonaceous matter. After being dried in the conveyer 16 the material goes to the hopper 18 and is slowly fed into the conveyer 20. The temperature in this conveyer is as a rule lower than in the succeeding conveyers beneath and a slight increase of temperature is desirable as the material progresses along the reducing conveyer tubes. A temperature of 300–350° C. or so is usually sufficient and the range from high to low may lie between these temperatures for the composition specifically mentioned. Hydrogen is introduced into the reducing tubes at 28 passing over the reduced progressively advancing stream of material in the cooling conveyer 27 and then through the reducing tubes apparently converting to some extent at least the occluded oxygen of the charcoal to water and expelling other gases, and combining with the oxygen of the nickel to form water. A large volume of steam is produced which dilutes the gas and somewhat interferes with its action; hence an excess of hydrogen should be used to sweep out the steam produced. Instead of introducing the hydrogen at 28 it may be introduced at 31 being heated in the preheater 32 to any desired reacting temperature. Or hydrogen may be introduced at both places. The excess of hydrogen is recovered. After the gases leave the upper conveyer tube 20 they may pass through a dust collector 36 and may then go to the interchanger 37. Here heat is given up to cooled hydrogen entering the reducing system again. Some condensation of the moisture takes place in the heat interchanger 37 and most of the remainder is removed in the water-cooled condenser or refrigerator and refrigerating drier 38. The fairly well dried gas may be further dried by the drier 43 and is then passed into the reducing tubes for further reducing action. Because the gas obtained in this manner is not as likely to be entirely pure and therefore not as well adapted to finish the reduction, I preferably introduce it into the second reducing tube 21 where it dilutes any steam formed at that point and is thus also beneficial here. The conveyer tubes are of such length that the charge remains therein, that is in the entire reducing bed for a period of from one to three hours. The conveyers should make only (preferably) about one revolution per minute. The slow turning of the material as a slowly advancing or progressing stream in the presence of hydrogen of greater and greater purity as the gradually reducing material constantly losing oxygen advances preferably into slightly but perceptibly hotter and hotter zones enables catalytic material of the highest degree of efficiency, other things being equal, to be prepared.

The finished catalyzer in the dry form may be incorporated with the main body of the oil to be treated, or the catalyzer may be wetted with oil and sealed from the air more or less and distributed to the treating tanks in that manner. While the dry catalyzer may not well be exposed even momentarily to the air, the oil wet catalyzer may be so exposed. For preservation of catalyzer for a long time under oil it is better to use a clean grade of mineral oil rather than to use a saponifiable oil. Or paraffin wax may be used and the catalyzer may be made up and handled or sold as an article of commerce in that way, as cakes of catalytic material.

While charcoal rendered active, is preferred as a hydrogen attracting and delivering base or catalyzer, I may make use of other carbonaceous material having similar active properties, or other equivalent material may be used. Also if for any reason it is desired, it is possible to mix with the charcoal a metallic catalyzer carried on an inert body as fullers' earth and the like although usually this is not to be recommended for the reasons aforesaid. A variety of metals may be used with the charcoal and the coöperative effect is usually manifest very quickly. Just what this coöperative action is I am not at this time able to say, but apparently the charcoal forms a solid solution with hydrogen and in addition to its own catalytic properties acts as a feeder for the more sluggishly absorbing metallic granules adjacent the charcoal particle.

The reduction of the catalyst may if desired take place under a pressure of hydrogen above the normal atmospheric pressure. A pressure of 4 or 5 pounds or even considerably higher may be used if desired.

With the foregoing disclosure it will now be evident to those skilled in the art that divers modifications of a constructional nature or otherwise may be made under the present invention, and it should be understood that I do not limit myself to the exact descriptive terms which are set forth herein in an illustrative sense. For example, the catalyzer may be fed along the conduits through the reducing zone created by the hydrogen atmosphere or otherwise, not as a continuous stream, but in an intermittent fashion which may be secured simply by having the conveyers turn periodically. Or the catalyzer may be moved through the conduit or series of conduits or reducing tubes as a progressively advancing continuously or intermittently moving layer or series of layers by placing the catalyzer or rather the catalyzer raw materials in thin layers in cars which are caused to travel through the reducing zone in the manner aforesaid or under the conditions aforesaid. In place of hydrogen various reducing gases may be employed also reducing vapors as ether or gasolene. Reduction by these agents or with hydrogen should be carried on preferably at a temperature somewhat above the minimum reducing temperature of the catalyzer materials employed; but the temperature on the other hand for the specific catalytic materials herein illustratively set forth preferably should not exceed the fusing or sintering point of the metallic derivative used, while the reducing zone should be kept free of catalyzer poisons of a contaminating nature, and the catalyzer material should be maintained in said reducing zone for a substantial period or at least until material de-oxygenation or other required form of reduction has progressed as desired. Finally it may be stated that reduction of nickel oxid or hydrate catalytic raw material with or without carriers such as silicious refractory material or with coördinating catalyzers of a non-metallic type such as active charcoal by continuously or substantially continuously passing catalytic raw material into and through a reducing or de-oxygenating zone to generate the desired catalytic properties, together with the subsequent collection of the more or less pyrophoric material in oil, enables perfect reducing conditions to be secured without great waste of hydrogen or other reducing body, enables a very large amount of catalyzer to be produced with the minimum of labor and obviates the employment of specially skilled labor, furthermore enabling the catalyzer to be made and handled with as great ease as though easily oxidizable material were not involved.

I claim—

1. The process of making catalytic material by reduction which comprises progressively advancing a body of unreduced material through a zone maintained under reducing conditions while free of catalyzer toxins, whereby a pyrophoric catalyzer body is produced, and in transferring same to a body of oil without deleterious contact with air.

2. The process of making catalytic material by reduction in hydrogen which comprises progressively advancing a body of unreduced material through a heated zone containing hydrogen while maintaining reducing conditions, whereby a pyrophoric catalytic body is produced, and in incorporating the latter with oily material to seal such body from the air prior to actual use as catalytic material.

3. The process of making catalytic material by reduction in hydrogen which comprises progressively advancing with agitation a body of unreduced material containing a reducible metallic derivative, through a heated reducing zone free from catalyzer poisons, whereby a pyrophoric catalyzer body is produced, and in transferring same to a body of oil without deleterious contact with air.

4. The process of making catalytic material by reduction in hydrogen which comprises progressively advancing with agitation a body of unreduced material containing a reducible metallic derivative, through a zone of a hydrogen containing gas heated to a reducing temperature and free from catalyzer poisons, whereby a pyrophoric catalyzer body is produced, and in transferring same to a body of oil without deleterious contact with air.

5. The process of making catalytic material by reduction through the aid of a reducing gas or vapor which comprises progressively advancing with agitation a body of unreduced catalyzer raw material containing a reducible metallic derivative, through a zone of said reducing gas or vapor heated to a reducing temperature; and in maintaining said zone free from catalyzer poisons, whereby a pyrophoric catalyzer body is produced, and in transferring same to a body of oil without deleterious contact with air.

6. The process of making catalytic material by reduction through the aid of a reducing gas or vapor which comprises slowly advancing with agitation a body of unreduced catalyzer raw material containing a reducible metallic derivative through a zone of said reducing gas or vapor heated to a temperature materially below the fusing point of the said metallic derivative but above the minimum reducing temperature, and in maintaining said zone free from absorbable catalyzer poisons or oxygen, whereby a pyrophoric catalyzer body is produced, and in transferring same to a body of oil without deleterious contact with air.

7. The process of making catalytic material adapted for the hydrogenation of oils, which comprises moving a body of catalyzer raw material through a reducing zone substantially free from contaminating catalyzer poisons, in maintaining said body within said zone for a protracted period, whereby material reduction of said body results, and whereby an easily oxidizable catalytic body is produced, and in enveloping said body in a sealing medium of a non-gaseous nature prior to actual use as catalytic material; whereby said body is preserved out of direct contact with air without substantial loss of catalytic properties.

8. The process of making catalytic material adapted for the hydrogenation of oils, which comprises moving a body of catalyzer raw material into and through a reducing zone substantially free from contaminating catalyzer poisons, in maintaining said body within said zone for a substantial period whereby material deoxidation of said body results, and whereby an easily oxidizable catalytic body is produced, and in enveloping said body in a sealing medium of a non-gaseous nature prior to actual use as catalytic material; whereby said body is preserved out of direct contact with air without substantial loss of catalytic properties.

9. The process of making catalyzers comprising subjecting a substantially progressively advancing layer of an oxygen-carrying catalyzer raw material to the action of an oxygen eliminant between temperature limits conductive to oxygen elimination, and in thereupon sealing the resulting material from air by enveloping with oily material.

10. The process of making catalyzers comprising freeing wood charcoal from salt and lime, in mixing said charcoal with nickel hydrate to afford a mixture containing less than 20% of metallic nickel and free from anticatalytic material, in drying the mixture, in subjecting a progressively advancing stream of the mixture to a slightly and gradually increasing temperature between the limits approximately 300 and 350° C. in the presence of a hydrogen-containing gas, said gas during the early period of the reduction of said mixture containing considerable moisture derived from catalyzer in a more advanced stage of reduction, in applying during the final stages of reduction a body of hydrogen as pure as possible, said hydrogen being preheated from hot gases coming from the reducing zone, in withdrawing hydrogen mingled with steam from the reducing zone, in drying same and returning to the said reducing zone, in cooling the catalyzer away from air and in mixing said catalyzer with a small quantity of oil prior to use in hydrogenation of a large body of oil; whereby a highly pyrophoric catalyzer may be exposed to air in its oil envelop without deleterious oxidation.

Signed at Montclair, in the county of Essex and State of New Jersey this 9th day of January, A. D. 1913.

CARLETON ELLIS.

Witnesses:
B. M. ELLIS,
I. DAVID LUBETSKI.